United States Patent

Mager et al.

Patent Number: 5,682,406
Date of Patent: Oct. 28, 1997

[54] METHOD AND APPARATUS FOR SETTTING THE PARAMETERS OF AN EQUALIZER

[75] Inventors: Klaus Mager; Edgar Wursthorn, both of Bad Dürrheim, Germany

[73] Assignee: Deutsche Thomson-Brandt GmbH, Villingen-Schwenningen, Germany

[21] Appl. No.: 424,758

[22] Filed: Apr. 18, 1995

[30] Foreign Application Priority Data

Apr. 30, 1994 [DE] Germany ............ 44 15 298.1

[51] Int. Cl.$^6$ .................. H03H 7/30; H03H 7/40; H03K 5/159
[52] U.S. Cl. .................. 375/232; 364/724.2; 333/28 R
[58] Field of Search .................. 375/229, 231–232; 364/724.01, 724.02, 724.2; 333/18, 28 R

[56] References Cited

FOREIGN PATENT DOCUMENTS

| 0471551 | 2/1992 | European Pat. Off. | H04N 5/93 |
| 1809418 | 6/1970 | Germany | H04B 1/10 |
| 2264110 | 7/1973 | Germany | H04B 3/04 |
| 2945332 | 5/1981 | Germany | H04L 25/03 |
| 3228840 | 2/1984 | Germany | H04L 25/03 |
| 3906284 | 9/1989 | Germany | H04B 3/14 |
| 3903165 | 8/1990 | Germany | G11B 5/09 |

OTHER PUBLICATIONS

"Nachrichtenubertragung", Hellmuth Wolf, Eine Einfuhrung in die Theorier, Springer–Verlag, Berlin Heidelberg NY 1974 pp. 111–116.

"Nachrichtentechnik" Adaptive Entzerrung von digitalen Signalen hoher Datenrate Dr.–Ing. C. Lemos, Dr–Ing. C. Munch Elektronik 25/16/12.1983 pp. 56–60.

IMP Computer Peripheral & Signal Processing Components, IMP42C555 Programmable Tracking Filter, pp. 1–10.

Primary Examiner—Stephen Chin
Assistant Examiner—Don Vo
Attorney, Agent, or Firm—Joseph S. Tripoli; Frederick A. Wein

[57] ABSTRACT

A method and apparatus for setting the parameters of an equalizer. Equalizers are used for equalizing distorted signals. However, optimum equalization is only achieved when the parameters of the equalizer are optimally set. To set the parameters of an equalizer optimally, the output signal of the equalizer is rectified in a full-wave rectifier. The output signal of the latter is integrated in an integrator. The parameters of the equalizer are set by a microprocessor according to an algorithm. In one embodiment, when the integration time is predetermined, the parameters of the equalizer is changed until the level of the integrated signal becomes a maximum. In another embodiment, when the maximum level of the integrated signal is predetermined, the parameters of the equalizer are changed until the integration time becomes a minimum.

3 Claims, 1 Drawing Sheet

METHOD AND APPARATUS FOR SETTTING THE PARAMETERS OF AN EQUALIZER

BACKGROUND

The invention relates to a method for setting the parameters of an equalizer.

Equalizers are used for equalizing distorted signals. The parameters of the equalizer must be set optimally to achieve optimum equalization of a distorted signal.

It is an object of the invention to specify a method for automatically setting the parameters of an equalizer.

SUMMARY OF THE INVENTION

The above stated object is achieved by the output signal of the equalizer: being rectified in a full-wave rectifier, with the output signal from the rectifier being integrated in an integrator, so that the parameters of the equalizer are set in such a manner that either the level of the integrated signal becomes maximum at a predetermined integration time or that the integration time is minimized at a fixed maximum level of the integrated signal.

DESCRIPTION OF THE DRAWINGS

The sole FIGURE shows an illustrative embodiment according to aspects of the present invention.

DETAILED DESCRIPTION OF THE PREFERRED EMBODIMENT

Figure 1:
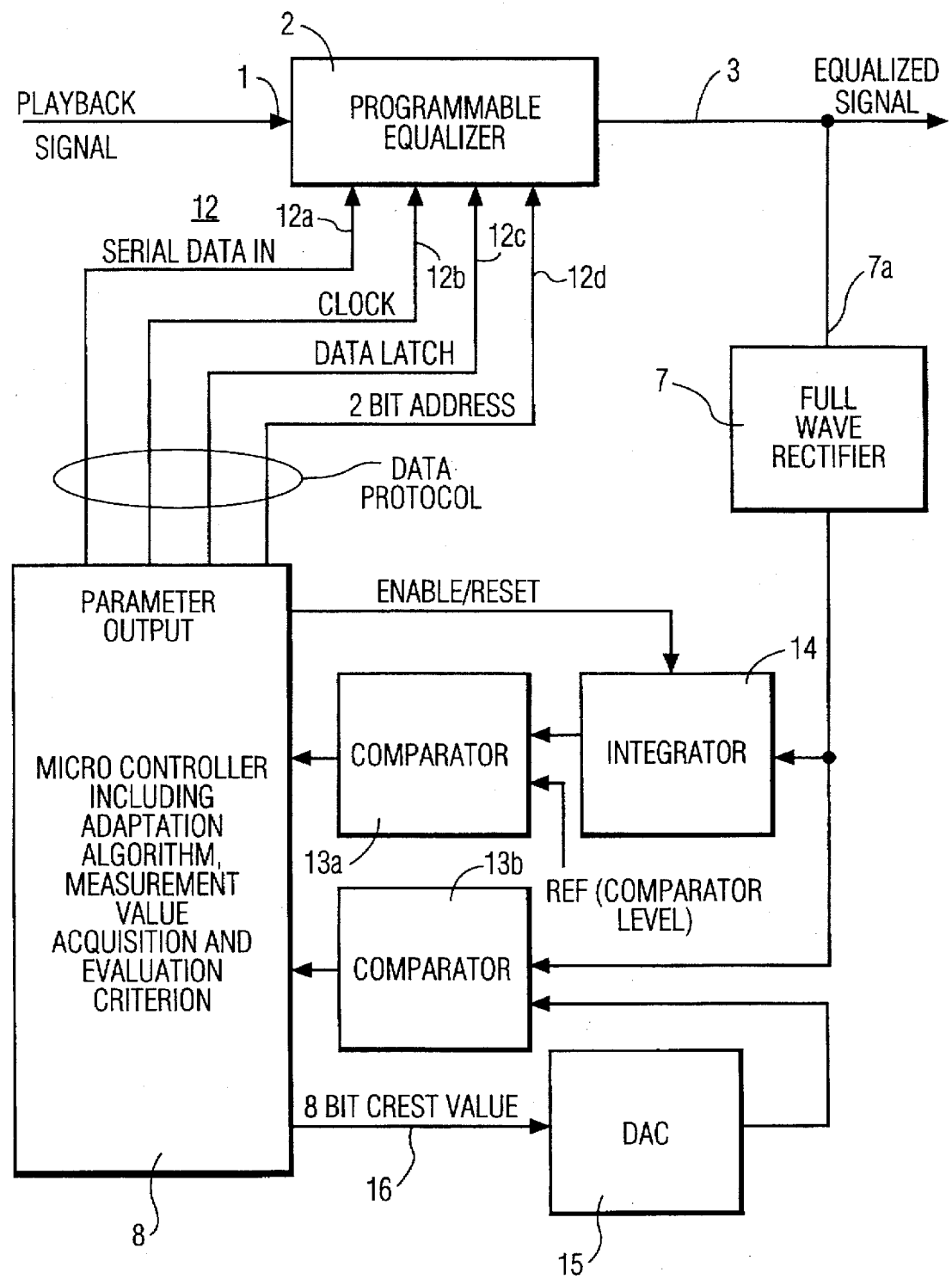

The signal to be equalized is supplied to an input of a programmable equalizer, which provides an output equalized signal 3 which is coupled to an input terminal 7a of a full-wave rectifier 7. The output signal of the full-wave rectifier 7 is coupled to an input terminal of an integrator 14 and to an input terminals of a comparator 13b. The output signal of the integrator 14 is coupled to a first input terminal of a comparator 13a. A second input terminal of comparator 13a is provided with a reference voltage. The output signal of first comparator 13a is connected to a first input terminal of a microprocessor/microcontroller 8, which has a first output signal 16 having an 8-bit crest value coupled to an input terminal of a digital/analog converter (DAC) 15. Microprocessor 8 includes an adaptation algorithm, and measurement value acquisition and evaluation criterion. The output signal of DAC 15 is coupled to a second input terminal of comparator 13b. Integrator 14 is resettable in response to microcontroller 8.

Parameter output signals 12 of microprocessor 8 are coupled to the parameter input terminals of equalizer 2, and these parameter output signals comprise a serial data in signal 12a, a clock signal 12b, a data latch signal 12c, and a 2 bit address signal 12d.

There are two ways to set the parameters of equalizer 2. In the first embodiment, the amplitude of the output signal at terminal 3 of equalizer 2 is first normalized and then rectified in the full-wave rectifier 7. The integrator 14 integrates the rectified output signal of the full-wave rectifier 7. In response thereto, via comparators 13a and 13b, microprocessor 8 generates the parameter signals 12 for equalizer 2 by means of an algorithm, in such a manner that the level of the output signal of the integrator 14 becomes a maximum at a predetermined integration time. The optimum parameters for equalizer 2 are found at the maximum level of the output signal of integrator 14.

The alternate embodiment is to hold the level of the integrated signal from integrator 14 reasonably constant and an integration time I is measured. Microprocessor 8 then sets the parameters for equalizer 2 by means of an appropriate algorithm, i.e. in such a manner that the integration time I becomes a minimum at the fixed maximum level of the integrated signal at the output of the integrator 14. The optimum parameters for the equalizer 2 are established when the integration time I becomes a minimum at the fixed maximum level of the signal at the output of the integrator 14.

During the calibration process, in each embodiment, two parameter settings are computed and compared with one another. The better one of the two is kept and compared with the next parameter setting. In this way, the optimum setting of the parameters is then achieved by successive approximation.

We claim:

1. Method for setting the parameters of an equalizer comprising the steps of:

the output signal of the equalizer is rectified in a fullwave rectifier;

the output signal of full-wave rectifier is integrated in an integrator providing an integrated signal, and the parameters of the equalizer are set in response to one of the level of the integrated signal becomes a maximum at a predetermined integration time and the integration time becomes a minimum at a fixed maximum level of the integrated signal, wherein two parameter settings are successively computed and compared with one another and the better one of the two is kept and compared with the next parameter setting.

2. Method according to claim 1 wherein the setting of the parameters for the equalizer are determined by means of a microprocessor according to an algorithm.

3. A circuit for setting the parameters of an equalizer comprising:

an equalizer for receiving an information signal and providing an output signal in response to signals coupled to a plurality of parameter adjustment input terminals;

a full-wave rectifier for receiving the output signal of the equalizer and providing an output signal;

an integrator for integrating the output signal of the full-wave rectifier;

a comparator for receiving the output signal of the integrator;

a first comparator for receiving the output signal of the integrator, and having a second input of a reference signal;

a second comparator for receiving the output signal of the full-wave rectifier;

a microprocessor for receiving the output of the first and second comparators and having a first output coupled to an input terminal of a DAC with the output of the DAC being coupled to a second input terminal of the second comparator, and the microprocessor providing parameter adjustment output signals which are coupled to the parameter input terminals of the equalizer.

* * * * *